(No Model.)

L. B. & G. W. LEE.
HEAD NET FOR HORSES.

No. 284,445. Patented Sept. 4, 1883.

WITNESSES:
John H. G. Deemer
C. Sedgwick

INVENTOR:
L. B. Lee
G. W. Lee
BY Munn & Co.
ATTORNEYS.

UNITED STATES PATENT OFFICE.

LUTHER B. LEE AND GEORGE W. LEE, OF RIDGEWOOD, NEW YORK.

HEAD-NET FOR HORSES.

SPECIFICATION forming part of Letters Patent No. 284,445, dated September 4, 1883.

Application filed July 21, 1883. (No model.)

*To all whom it may concern:*

Be it known that we, LUTHER B. LEE and GEORGE W. LEE, both of Ridgewood, in the county of Queens and State of New York, have invented a new and Improved Head-Net for Horses, of which the following is a full, clear, and exact description.

This invention consists of a leather head-net for horses, adapted to be placed over or under the bridle, for protecting the horse from being annoyed about the head and throat by flies.

The invention also consists of the special construction of the net, whereby it may be easily placed upon a horse's head, and whereby the same is adapted to be used upon a large or small horse, as occasion requires.

Reference is to be had to the accompanying drawings, forming part of this specification, in which similar letters of reference indicate corresponding parts in both the figures.

Figure 1:
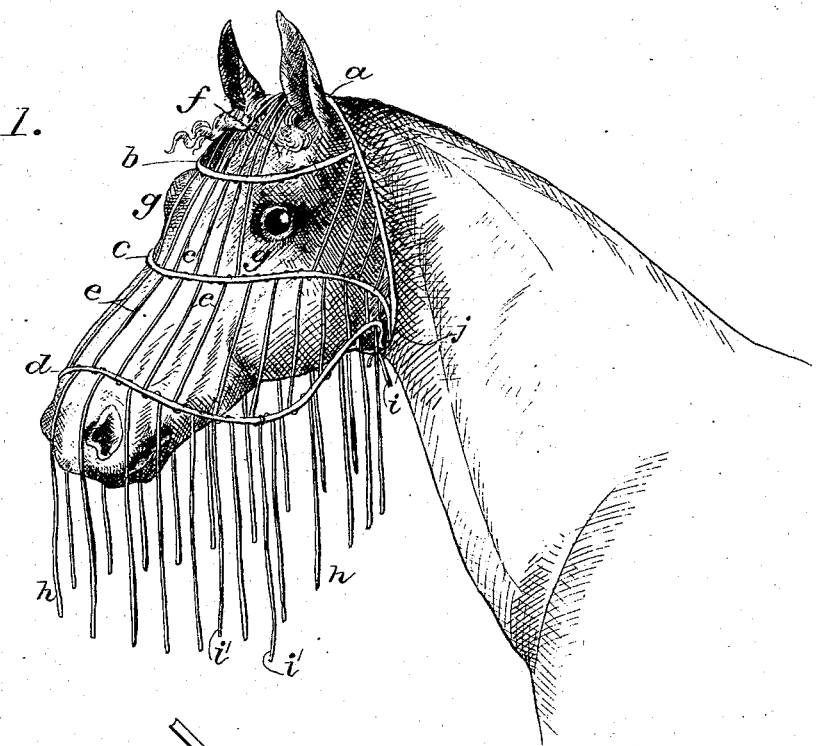
Figure 2:
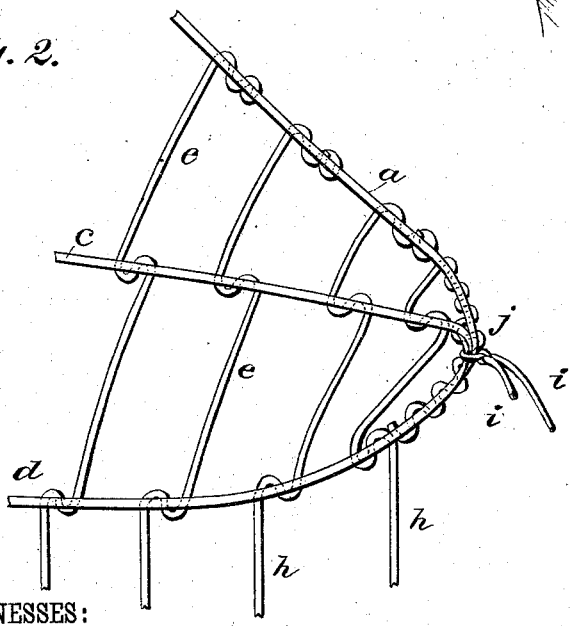

Figure 1 is a perspective view, showing our new and improved head-net as it appears when placed upon the horse's head; and Fig. 2 is a detailed plan view of a part of the net.

In making our new and improved head-net, we take a number of strips, $a$, of leather, of sufficient length to pass around a horse's head back of the ears and lap a considerable distance under the throat. To this strap $a$, at points equidistant from the center of its length and a distance apart equal to the width of any horse's head, we attach the ends of the forehead-strip $b$, which is of sufficient length to circle down upon the forehead of the horse, as shown in Fig. 1. To the ends of the strip $a$ we then attach the ends of the face-strap $c$ and nose-strip $d$. The strip $c$ is of sufficient length to circle below the horse's eyes, and the strip $d$ reaches nearly to the nose of the horse, and this latter strip sags at the sides below the cheeks of the horse, as illustrated, and these strips $c$ $d$, together with the strips $a$ $b$, form the ribs or frame of the net. These strips $a$ $b$ $c$ $d$, being thus attached, are then thickly interlaced with the leather strings $e$ $e$, leaving spaces $f f$ and $g$ $g$ between the lacings for the ears and eyes of the horse, and the lacing-strings $e$ $e$ are extended below the nose-strip $d$, all around, to form the fringe or pendent pieces $h$ $h$, that serve to keep the flies from attacking the horse's chin and throat.

In putting the net upon a horse's head, the strip $a$ is first placed around the horse's head back of the ears, and the rounded ends $j$ of the net are brought under his throat, and are tied together by the strings $i$ $i$. A second set of strings, $i'$ $i'$, are used for tying the net under the lower jaw of the horse. The face portion of the net will then be adjusted over the face of the horse in proper shape, as illustrated in Fig. 1, and it is designed to use with our new net, when desired, suitable ear-nets, made of leather or other material, to protect the ears of the horse.

The lacing and the attachment of the strips $b$, $c$, and $d$ being made with reference to the center of the strip $a$, it will be seen that the net may be adjusted upon the head of any horse, whether large or small, and it will be seen that, owing to the strip $d$ sagging below the cheeks of the horse, the net may be brought under the horse's throat and tied along his under jaw to perfectly exclude the flies. Besides these advantages, the net is strong, durable, practical, and cheap.

We do not abandon or dedicate to the public any patentable feature set forth herein and not hereinafter claimed, but reserve the right to claim the same either in a reissue of any patent that may be granted upon this application or in other applications for Letters Patent that we may make.

Having thus described our invention, what we claim as new, and desire to secure by Letters Patent, is—

1. A head-net for horses, composed of the main strip $a$, forehead-strip $b$, face-strip $c$, nose-strip $d$, and lacing $e$, the strips $b$ $c$ $d$ being attached to strip $a$, and the lacings being arranged to form the openings $f f$ and $g$ $g$, and extended below the strip $d$ to form the fringe $h$, substantially as described.

2. In a leather head-net for horses, the nose-strip $d$, attached at its ends to the main strip $a$, and arranged to sag below the cheeks of the horse, so that the net may be tied under the horse's throat, substantially as and for the purposes set forth.

3. In a head-net for horses, the strips $c$ $d$, attached at their ends to the ends of the main strip $a$, in combination with the forehead-strip $b$ and lacings $e$, arranged with reference to the center of the strip $a$, whereby the net may be placed upon large and small horses, substantially as described.

LUTHER B. LEE.
GEORGE W. LEE.

Witnesses:
WILLET WHITMORE,
JAMES M. SEAMAN, Jr.